(12) United States Patent
Martinez et al.

(10) Patent No.: US 6,993,349 B2
(45) Date of Patent: Jan. 31, 2006

(54) SMART RINGER

(75) Inventors: Paul Martinez, San Diego, CA (US); Scott Beith, San Diego, CA (US)

(73) Assignee: Kyocera Wireless Corp., San Diego, CA (US)

( * ) Notice: Subject to any disclaimer, the term of this patent is extended or adjusted under 35 U.S.C. 154(b) by 781 days.

(21) Appl. No.: 09/908,057

(22) Filed: Jul. 18, 2001

(65) Prior Publication Data

US 2003/0017859 A1    Jan. 23, 2003

(51) Int. Cl.
*H04Q 7/20*    (2006.01)

(52) U.S. Cl. .................. 455/456.4; 455/567

(58) Field of Classification Search ............. 455/456.4, 455/567
See application file for complete search history.

(56) References Cited

U.S. PATENT DOCUMENTS

| 6,408,187 B1 * | 6/2002 | Merriam ................. 455/458 |
| 6,436,278 B1 * | 8/2002 | Benazzi et al. .......... 208/62 |
| 6,574,471 B1 * | 6/2003 | Rydbeck ................. 455/418 |

* cited by examiner

*Primary Examiner*—Ahmad F. Matar
*Assistant Examiner*—Quynh H. Nguyen

(57) ABSTRACT

A telephone monitors ambient noise, and alters the characteristics of the audible ring to distinguish the sound of the ringing telephone from the ambient noise. Such characteristics include the decibel level, the sound frequency, and the rhythmic pattern or the ringing sound.

10 Claims, 1 Drawing Sheet

SMART RINGER

FIELD OF THE INVENTION

This invention relates to telecommunications, and more particularly to ringer control for wireless telecommunications handsets.

BACKGROUND

A wireless telephone can receive telephone calls in any location within a zone covered by a compatible wireless telephone service. In this way, a user can stay in communication with others without the need to remain tied to a conventional telephone at a particular location. If the user carries his or her wireless telephone to a location having significant ambient noise, however, he or she may be unable to hear is the telephone ring due to that ambient noise, causing an incoming call to be missed. Some wireless telephones allow the user to select a ringing sound that starts at a low volume and escalates to a higher volume if the user does not answer within a fixed time, regardless of the characteristics of the ambient noise environment. However, a louder ringer still may not be easily heard in certain noise environments. Further, this solution may be problematic if the wireless telephone is used in a quiet location and the user is unable to immediately answer an incoming call, as the escalating ringing sound may cause consternation to others.

SUMMARY

It is desirable for a wireless telephone to emit a ringing sound that can be heard by a user in a noisy environment. It is therefore an object of the invention to enable the wireless telephone to analyze the characteristics of the ambient noise environment. It is a further object of the invention to enable the wireless telephone to alter the characteristics of the ringing sound based on the characteristics of the ambient noise environment.

To overcome the disadvantages of the prior art and meet the objectives of this invention, a wireless telephone monitors the characteristics of the ambient noise environment around it. The wireless telephone then alters the characteristics of the ringing sound emitted by the telephone to distinguish the ringing sound from the ambient noise.

In one aspect of the invention, a telephone monitors the decibel level of ambient noise, and adjusts the decibel level of the ring emitted by the ringer to exceed the ambient noise level. In this way, the sound of the ringing telephone is louder than ambient noise, so that a user can readily determine in a noisy environment that the telephone is ringing. This feature may be useful, for example, at loud parties or sporting events.

In another aspect of the invention, the telephone monitors the frequency of ambient noise, and adjusts the frequency of the ring emitted by the ringer to differ from the ambient noise frequency. In this way, the sound of the ringing telephone is sufficiently distinguished from the ambient sound that a user can readily determine in a noisy environment that the telephone is ringing. This feature may be useful, for example, in motor vehicles where road noise or wind noise is at a steady frequency, or in manufacturing environments having steady background noises produced by heavy machinery.

In another aspect of the invention, the telephone samples the ambient noise for a time period, and analyzes the ambient noise for rhythmic sound level variations. The telephone then adjusts the pattern of the ring emitted from the ringer to distinguish it from the rhythm of the ambient noise. The pattern of the ring may have a rhythm timed differently from the rhythm of the ambient noise, or may have the same rhythm as the ambient noise, but out of phase with the rhythm of the ambient noise. In this way, the rhythm of the ringer is sufficiently distinguished from the rhythm of the ambient noise that the user can readily determine that the telephone is ringing. This feature may be useful, for example, in manufacturing environments where heavy machinery produces loud rhythmic noises, or at performances of music having strong rhythmic components.

The invention will be more fully understood upon consideration of the detailed description below, taken together with the accompanying drawings.

BRIEF DESCRIPTION OF THE DRAWINGS

Use of the same reference symbols in different figures indicates similar or identical items.

DETAILED DESCRIPTION OF THE PREFERRED EMBODIMENTS

Figure 1:
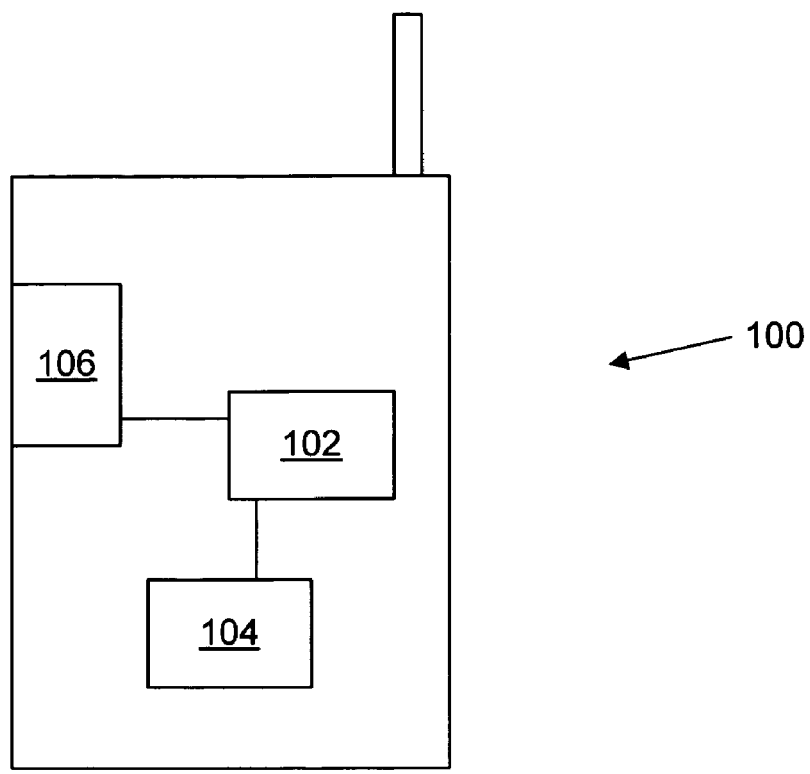
FIG. 1 is a block diagram of a wireless telephone.

Referring to FIG. 1, a wireless telephone 100 is shown. In one embodiment, the wireless telephone 100 is a cellular telephone, a PCS-band telephone, a satellite-based telephone compatible with the IRIDIUM® or GLOBALSTAR® services, or other type of self-contained wireless telephone. In another embodiment, the wireless telephone 100 is the handset of a cordless telephone system, capable of wireless communication with a base station connected to a telephone line by a cable.

The wireless telephone 100 includes a controller 102. The controller 102 is capable of controlling the wireless telephone 100 and/or processing signals. The controller 102 is a logic unit such as an application-specific integrated circuit (ASIC), a microprocessor, a field-programmable gate array (FPGA), a digital signal processor (DSP), a combination of one or more of the above devices, or another device. The controller 102 is standard in the art.

The wireless telephone 100 also includes a ringer 106, which is electrically connected to the controller 102 by a wire, circuit board trace, or other conductor. The ringer 106 is adapted to produce a ringing sound upon activation of the ringer 106 by the controller 102. The controller 102 may activate the ringer 106 when an incoming call is received, when a voicemail message is received, or when other conditions are met or other events occur. In one embodiment, the ringer 106 is a speaker, which generates sound based on signals received from the controller 102. The structure of the ringer 106 is standard in the art. In one embodiment, the ringer 106 is the earpiece of the wireless telephone 100. In this document, the term "earpiece" refers to the component or components or the wireless telephone 100 adapted to be placed adjacent the user's ear when the user is conducting a conversation via the wireless telephone 100. In this embodiment, a separate device for generating a ringing sound is not needed.

The wireless telephone 100 also includes a sound detection unit 104, which is electrically connected to the controller 102 by a wire, circuit board trace, or other conductor. The sound detection unit 104 is adapted to detect characteristics of ambient noise around the wireless telephone 100, as described in greater detail below. The sound detection unit 104 may be a microphone or other device capable of sensing sound. In one embodiment, the sound detection unit 104 converts acoustic energy to analog electrical signals, as is standard in the art. In another embodiment, the sound detection unit 104 converts acoustic energy into digital electronic signals. In either case, those signals are transmitted from the sound detection unit 104 to the controller 102. In one embodiment, the sound detection unit 104 is the mouthpiece of the wireless telephone 100. In this document, the term "mouthpiece" refers to the component or components or the wireless telephone 100 into which the user speaks while using the wireless telephone. In this embodiment, a separate device for detecting ambient noise is not needed. The combination of the sound detection unit 104 and the mouthpiece of the wireless telephone 100 may be used if, for example, the mouthpiece of the wireless telephone 100 is exposed when the wireless telephone 100 is not being used.

Figure 2:
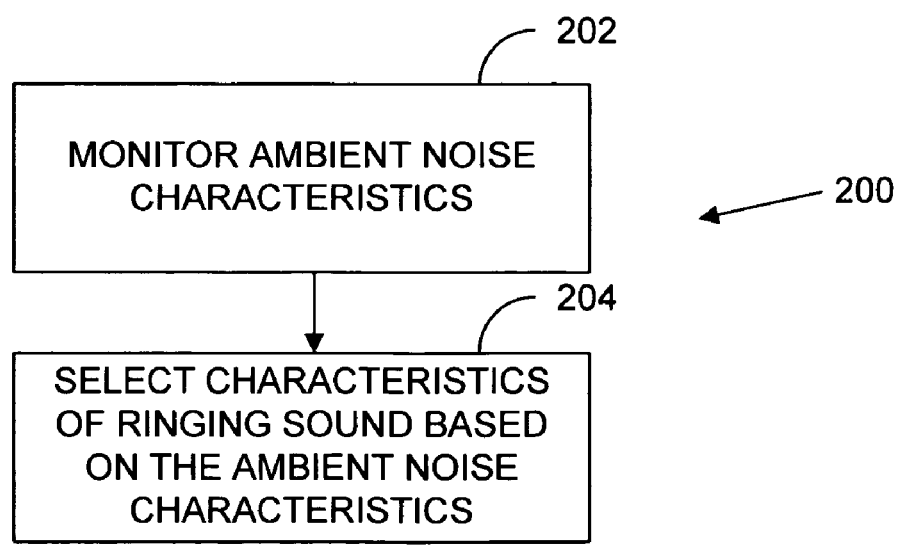
FIG. 2 is a flow chart of a method for controlling the characteristics of a ringing sound emitted from a wireless telephone.

Referring to FIG. 2, a method 200 is shown for controlling the characteristics of a ringing sound emitted from the ringer 106 of the wireless telephone 100. In step 202, the controller 102 monitors the characteristics of the ambient noise environment around the wireless telephone 100. The controller 102 performs this monitoring via the sound detection unit 104, which is adapted to monitor the ambient noise environment.

In one embodiment, the controller 202 monitors the decibel level of the ambient noise environment. In another embodiment, the controller 102 monitors the sound frequency of the ambient noise. That is, the controller 102 determines if a particular sound frequency is predominant within the ambient noise, and identifies such a frequency if present. For example, road and engine noise may create a substantially steady frequency within a motor vehicle, which is identified by the controller 102 when the wireless telephone 100 is inside the motor vehicle. As another example, the wireless telephone 100 may be used in an industrial environment in which heavy machinery generates noise having a substantially steady frequency, and the controller 102 identifies that frequency. In another embodiment, the controller 102 monitors rhythmic sound level variations in the ambient noise environment. As used in this document, the phrase "rhythmic sound level variations" refers to substantially regular alternations of contrasting elements of sound. These rhythmic sound level variations may be characterized by changes in decibel level. Strong rhythmic sound level variations are found in many types of music, such as techno or hip-hop, as well as in the operation of certain types of heavy machinery. The controller 102 may utilize a number of techniques to monitor rhythmic sound level variations of the ambient noise. In one embodiment, the controller 102 samples the ambient noise environment via the sound detection unit 104 for a fixed time, such as one or two seconds. The controller 102 then analyzes the sampled ambient noise to determine whether rhythmic sound level variations are present, and if so, determines the pattern of those rhythmic sound level variations.

The monitoring performed in step 202 may be continuous, if desired. In another embodiment, to conserve power, such monitoring is performed for a brief time period of several seconds or less when an incoming call is received, before the ringer 106 is controlled to emit a ringing sound.

Next, in step 204, the controller 102 selects the characteristics of the ringing sound to be produced by the ringer 106, based on the results of the monitoring of step 202. If in step 202 the controller 102 monitored the decibel level of the ambient environment, then in step 204 the controller 102 selects a decibel level for the ringing sound produced by the ringer 106 that is higher than the decibel level of the ambient environment. In one embodiment, the controller 102 selects a decibel level for the ringing sound that is substantially five decibels higher than the decibel level of the ambient environment. This five-decibel differential allows the ringing sound to be heard above the ambient noise, without being unduly loud. In one embodiment, if the ambient noise decibel level is not constant, then the controller 102 allows the ringing sound to default to a preset decibel level. In another embodiment, if the ambient noise decibel level is not constant, the controller 102 senses a peak ambient noise level in step 202, and in step 204 controls the decibel level of the ringing sound to be louder than the peak ambient noise level.

If in step 202 the controller 102 monitored the sound frequency of the ambient noise environment, then in step 204 the controller 102 selects a frequency for the ringing sound produced by the ringer 106 that is different from the sound frequency of the ambient environment. In one embodiment, the selected sound frequency of the ringer is higher than the sound frequency of the ambient environment. For some users, the higher frequency for the ringer sound may be more readily distinguished from ambient noise. However, the selected sound frequency of the ringer may be lower than the sound frequency of the ambient environment, if desired. In one embodiment, the user can select whether the sound frequency of the ringing sound should be offset higher or lower than the sound frequency of the ambient noise environment. In one embodiment, if the sound frequency of the ambient noise environment is not constant, then the controller 102 allows the ringing sound to default to a preset frequency. In another embodiment, if the ambient noise frequency is not constant, the controller 102 senses the highest or lowest sound frequency in the ambient environment in step 202, and in step 204 controls the frequency of the ringing sound to be higher than the highest ambient sound frequency or lower than the lowest ambient sound frequency.

If in step 202 the controller monitored the rhythmic sound level variations in the ambient noise environment, then in step 204 the controller 102 selects a pattern for the ring noise produced by the ringer 106 that is different from the sensed rhythmic pattern of the ambient environment. The ringing noise may be differentiated from the sensed rhythmic pattern in one of at least two ways. First, the rhythmic pattern of the ringing sound may be controlled to have a faster or slower rhythm than the rhythmic pattern of the ambient environment. For example, if the rhythmic pattern of the ambient environment is characterized by a rhythm of 120 beats per minute, the rhythmic pattern of the ringing sound may be controlled to have a rhythm of 150 beats per minute to distinguish the ringing sound from the ambient environment. The amount by which the rhythm of the ringing sound is faster than or slower than the rhythmic pattern of the ambient environment may be preset as a default amount, or may be selected by the user. Second, the rhythmic pattern of the ringing sound may be out of phase with the rhythmic sound level variations of the ambient environment. That is, the ringing sound has substantially the same rhythm as the rhythmic sound level variations of the ambient environment, but offset such that the decibel level peaks of the ringing sound are emitted between the decibel level peaks associated with the rhythmic pulses of the ambient environment. For example, if the ambient environment is characterized by a rhythm of 60 beats per minute, the ringing sound is controlled to have a rhythm of 60 beats per minute as well, but is offset substantially 0.5 seconds from the rhythmic pulses of the ambient environment, such that the decibel level peaks of the ringing sound are emitted between the rhythmic pulses of the ambient environment. In one embodiment, if the rhythmic sound level variations of the ambient noise environment are not constant, then the controller 102 allows the ringing sound to default to a preset rhythmic pattern. In another embodiment, if the rhythmic sound level variations of the ambient noise environment are not constant, the controller 102 senses a particular rhythmic sound level variation pattern in step 202, and in step 204 controls the rhythmic pattern of the ringing sound to be different from that particular rhythmic sound level variation pattern in the ambient environment.

Steps 202 and 204 may be performed repeatedly in the time period during which the ringing sound is emitted, such that the characteristics of the ringing sound can be changed in response to changing characteristics of the ambient noise environment. In addition, while the control of individual characteristics of the ringing sound has been described above, two or more individual characteristics of the ringing sound may be controlled at the same time, if desired. For example, the decibel level and the sound frequency of the ringing sound may both be controlled to better distinguish the ringing sound from the ambient noise environment.

Although the invention has been described with reference to particular embodiments, the description is only an example of the invention's application and should not be taken as a limitation. Consequently, various adaptations and combinations of features of the embodiments disclosed are within the scope of the invention as defined by the following claims and their legal equivalents.

What is claimed is:

1. A method for controlling a ringing sound emitted from a wireless telephone, comprising the steps of:
   monitoring a rhythmic sound level variation in an ambient noise environment around the wireless telephone;
   selecting a ringing sound decibel level;
   modifying a ringer rhythmic sound level for the ringing sound such that the ringing sound is distinguishable from the rhythmic sound level variation in the ambient noise environment; and
   outputting the modified ringing sound at the selected ringing sound decibel level.

2. The method of claim 1, wherein the step of monitoring the rhythmic sound level variation in the ambient noise environment comprises the steps of:
   sampling the ambient noise environment for a time period;
   analyzing the sampled ambient noise environment for rhythmic sound level variation over the time period, and
   selecting the ringer rhythmic sound level variation based upon the analysis.

3. The method of claim 1, wherein the ringer rhythmic sound level variation for the modified ringing sound has a different beats per time period than the rhythmic sound level variation of the ambient noise environment.

4. The method of claim 1, wherein the ringer rhythmic sound level variation for the modified ringing sound is out of phase with the rhythmic sound level variation of the ambient noise environment.

5. A method for controlling a ringing sound of a plurality of ringing sounds emitted from a wireless telephone, comprising the steps of:
   monitoring the decibel level of an ambient noise environment,
   monitoring the sound frequency of the ambient noise environment, and
   monitoring the rhythmic sound level variations of the ambient noise environment;
   selecting the ringing sound of the plurality of ringing sounds, the ringing sound having a default decibel level, a default frequency, and a default rhythmic sound level variation; and
   adjusting at least one of the default decibel level, the default frequency, and the default rhythmic sound level variation of the selected ringing sound to differ from at least one of the monitored decibel level, the monitored sound frequency, and the monitored rhythmic sound level variations.

6. A wireless telephone, comprising:
   a ringer for producing at least one ringing sound of a plurality of ringing sounds, the ringer having a default ringer decibel level;
   a sound detection unit for detecting ambient noise in proximity to the wireless telephone, and for outputting an ambient noise signal; and
   a controller electrically connected to the ringer and the sound detection unit, the controller comprising:
      means for monitoring the ambient noise signal from the sound detection unit for an ambient noise characteristic of a plurality of ambient noise characteristics of the ambient noise,
      means for adjusting the default ringer decibel level, and
      means for adjusting the at least one ringing sound of the plurality of ringing sounds such that the ringing sound has a ringing characteristic distinguishable from the detected ambient noise characteristic.

7. The wireless telephone of claim 6, wherein the ambient noise characteristic comprises at least one of a sound frequency and a rhythmic sound variation.

8. The wireless telephone of claim 6, wherein the ambient noise characteristic comprises an ambient decibel level, and wherein the means for adjusting the default ringer decibel level adjusts the at least one ringing sound to be substantially five decibels higher than the ambient decibel level.

9. The wireless telephone of claim 6, wherein the ambient noise characteristic comprises an ambient sound frequency, and wherein the means for adjusting the at least one ringing sound adjusts a ringer frequency of the at least one ringing sound to be different than the ambient sound frequency.

10. The wireless telephone of claim 6, wherein the ambient noise characteristic comprises an ambient rhythmic sound variation, and wherein the means for adjusting the at least one ringing sound adjusts a ringer rhythmic sound variation of the at least one ringing sound to be different than the ambient rhythmic sound variation.

* * * * *